(12) United States Patent
Spangler (10) Patent No.: US 11,220,912 B2
(45) Date of Patent: Jan. 11, 2022

(54) AIRFOIL WITH Y-SHAPED RIB (71) Applicant: Raytheon Technologies Corporation, Farmington, CT (US)

(72) Inventor: Brandon W. Spangler, Vernon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 16/850,593

(22) Filed: Apr. 16, 2020

(65) Prior Publication Data

US 2021/0324741 A1 Oct. 21, 2021

(51) Int. Cl.
*F01D 5/14* (2006.01)

(52) U.S. Cl.
CPC .......... *F01D 5/147* (2013.01); *F05D 2220/32* (2013.01); *F05D 2240/30* (2013.01)

(58) Field of Classification Search
CPC ... F01D 5/147; F05D 2220/32; F05D 2240/30
See application file for complete search history.

(56) References Cited

U.S. PATENT DOCUMENTS

| | | | |
|---|---|---|---|
| 5,156,526 A * | 10/1992 | Lee | F01D 5/187 416/97 R |
| 5,246,340 A * | 9/1993 | Winstanley | B23P 15/04 415/115 |
| 6,126,396 A * | 10/2000 | Doughty | F01D 5/20 416/97 R |
| 6,183,198 B1 * | 2/2001 | Manning | F01D 5/186 415/115 |
| 6,206,638 B1 | 3/2001 | Glynn et al. | |
| 6,832,889 B1 * | 12/2004 | Lee | F01D 5/184 415/115 |
| 7,131,818 B2 | 11/2006 | Cunha et al. | |
| 7,217,092 B2 | 5/2007 | Lee et al. | |
| 7,296,973 B2 * | 11/2007 | Lee | F01D 5/187 416/97 R |
| 7,871,245 B2 | 1/2011 | Peitraszkiewicz et al. | |
| 10,378,364 B2 | 8/2019 | Spangler et al. | |
| 10,465,525 B2 | 11/2019 | Jones et al. | |
| 10,871,074 B2 * | 12/2020 | Spangler | F01D 5/181 |
| 2005/0111977 A1 * | 5/2005 | Lee | F01D 5/187 416/97 R |

(Continued)

OTHER PUBLICATIONS

European Search Report for European Patent Application No. 21168388.3 completed Aug. 17, 2021.

*Primary Examiner* — Justin D Seabe
*Assistant Examiner* — Theodore C Ribadeneyra
(74) *Attorney, Agent, or Firm* — Carlson, Gaskey & Olds, P.C.

(57) ABSTRACT

An airfoil includes an airfoil wall that defines a leading end, a trailing end, a first side wall, and a second side wall. A rib connects the first and second side walls of the airfoil wall. The rib includes first and second unbranched arms that initiate at the second side wall and extend there from to meet at a node. A third unbranched arm initiates at the first side wall. The third unbranched arm extends perpendicularly there from and connects at either the node, the first unbranched arm, or the unbranched second arm.

20 Claims, 4 Drawing Sheets

(56) References Cited

U.S. PATENT DOCUMENTS

| | | | |
|---|---|---|---|
| 2005/0226726 A1* | 10/2005 | Lee | F01D 5/187 |
| | | | 416/97 R |
| 2007/0128034 A1* | 6/2007 | Lee | F01D 5/187 |
| | | | 416/97 R |
| 2009/0269210 A1* | 10/2009 | Pietraszkiewicz | F01D 5/187 |
| | | | 416/96 R |
| 2010/0254824 A1 | 10/2010 | Shailendra et al. | |
| 2017/0328220 A1* | 11/2017 | Weber | F01D 5/141 |
| 2019/0101007 A1* | 4/2019 | Propheter-Hinckley | |
| | | | F01D 9/041 |
| 2019/0136699 A1* | 5/2019 | Spangler | F02C 7/18 |

* cited by examiner

AIRFOIL WITH Y-SHAPED RIB

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil wall that defines a leading end, a trailing end, a first side wall, and a second side wall. A rib connects the first and second side walls of the airfoil wall. The rib includes first and second unbranched arms initiating at the second side wall and extending there from to meet at a node, and a third unbranched arm initiating at the first side wall. The third unbranched arm extends perpendicularly there from and connects at either the node, the first unbranched arm, or the unbranched second arm.

In a further embodiment of any of the foregoing embodiments, the third unbranched arm connects at the node.

In a further embodiment of any of the foregoing embodiments, the third unbranched arm connects at one of the first or second unbranched arms.

In a further embodiment of any of the foregoing embodiments, the first and second unbranched arms together with the second side define a triangular passage.

In a further embodiment of any of the foregoing embodiments, with the second side wall as a base, the triangular passage defines a height (h) and a width (w) that have a ratio of h/w of less than 0.75.

In a further embodiment of any of the foregoing embodiments, the ratio is less than 0.5.

In a further embodiment of any of the foregoing embodiments, the third arm and the first side wall border a passage that is flow isolated from the triangular passage.

In a further embodiment of any of the foregoing embodiments, the first and second arms are of substantially equal length.

An airfoil according to an example of the present disclosure includes an airfoil wall that defines a leading end, a trailing end, a first side wall, and a second side wall. A pair of ribs define there between a pentagonal passage. Each said rib connects the first and second side walls of the airfoil wall and including first and second unbranched arms initiating at one of the first side wall or the second side wall and extending there from to meet at a node, the first and second unbranched arms together with the one of the first side wall or the second side wall defining a triangular passage there between. A third unbranched arm initiates at the other of the first side wall or the second side wall, the third unbranched arm extends perpendicularly there from and connecting at the node.

In a further embodiment of any of the foregoing embodiments, the pentagonal passage has a longest side defined by the first side wall.

In a further embodiment of any of the foregoing embodiments, the second side wall is a suction side.

In a further embodiment of any of the foregoing embodiments, the pentagonal passage is part of a serpentine cooling air circuit.

In a further embodiment of any of the foregoing embodiments, the pentagonal passage excludes any cooling apertures through the first and second side walls.

A gas turbine engine according to an example of the present disclosure includes a compressor section, a combustor in fluid communication with the compressor section, and a turbine section in fluid communication with the combustor. The turbine section has an airfoil that includes an airfoil wall that defines a leading end, a trailing end, a first side wall, and a second side wall. A rib connects the first and second side walls of the airfoil wall. The rib has first and second unbranched arms initiating at the second side and extending there from to meet at a node, and a third unbranched arm initiating at the first side wall. The third unbranched arm extends perpendicularly there from and connects at either the node, the first unbranched arm, or the unbranched second arm.

In a further embodiment of any of the foregoing embodiments, the first and second unbranched arms together with the second side define a triangular passage.

In a further embodiment of any of the foregoing embodiments, with the second side wall as a base, the triangular passage defines a height (h) and a width (w) that have a ratio of h/w of less than 0.5.

In a further embodiment of any of the foregoing embodiments, the third arm and the first side wall border a passage that is flow isolated from the triangular passage.

In a further embodiment of any of the foregoing embodiments, the first and second arms are of substantially equal length.

In a further embodiment of any of the foregoing embodiments, the third unbranched arm connects at the node.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
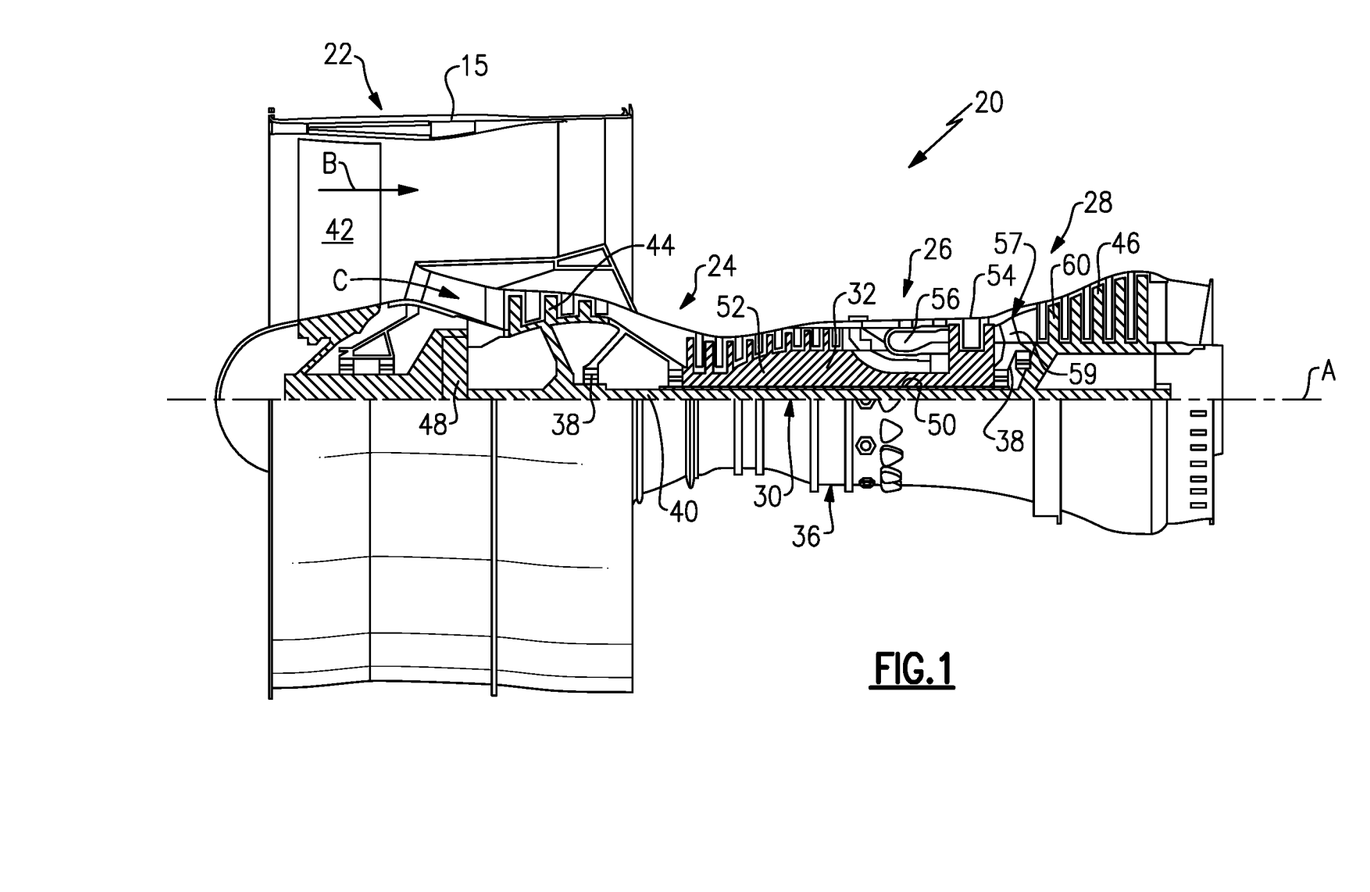
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figures 2A, 2B:
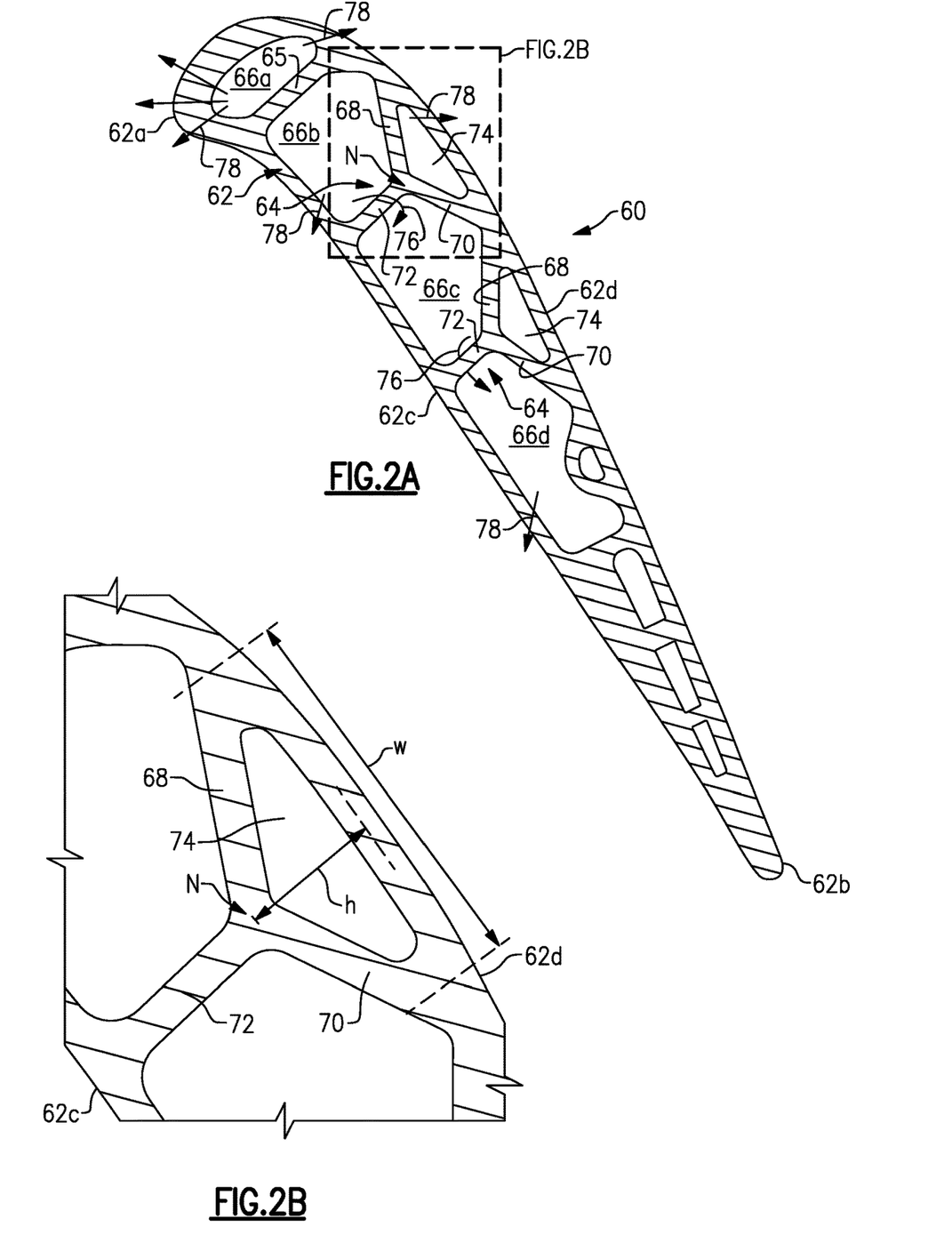
FIG. 2A illustrates a sectioned view of an airfoil from the gas turbine engine.
FIG. 2B illustrates a view of a portion of the airfoil of FIG. 2A.

FIG. 2A shows a representation of a sectioned airfoil 60 used in the turbine engine 20 (see also FIG. 1), and FIG. 2B illustrates a view of the region identified in FIG. 1. The airfoil 60 is a turbine blade; however, it is to be understood that this disclosure is also applicable to cooled blades or vanes.

The airfoil 60 includes an (outer) airfoil wall 62 that spans in a radial direction and delimits the aerodynamic profile of the airfoil 60. In this regard, the wall 62 defines a leading end 62a, a trailing end 62b, and first and second side walls 62c/62d that join the leading end 62a and the trailing end 62b. In this example, the first side wall 62c is a pressure side and the second side wall 62d is a suction side. The terminology "first" and "second" as used herein is to differentiate that there are two architecturally distinct components or features. It is to be understood that the terms "first" and "second" are interchangeable in the embodiments herein such that a first component or feature could alternatively be termed as a second component or feature, and vice versa.

The airfoil 60 further includes one or more ribs 64. In the illustrated example, the airfoil has two such ribs 64, although in modified examples the airfoil 60 can include a single rib 64 or more than two ribs 64. And although a single rib 64 is described in some instances herein, it is to be understood that each such rib 64 has the described attributes of the single rib 64. The ribs 64 and a rib 65 partition the interior cavity of the airfoil 60 into several passages, which in this example include a forward-most passage 66a, an aft-most passage 66d, a forward intermediate passage 66b, and an aft intermediate passage 66c.

Each rib 64 connects the first and second side walls 62c/62d and is generally longitudinally elongated between an inner diameter and outer diameter of the airfoil 60. Except for connection through the airfoil wall 62, the ribs 64 are disjoined from each other. As used herein, the term "disjoined" refers to the ribs 64 excluding any structural attachments to each other. Such an attachment configuration permits each rib 64 to reinforce the side walls 62c/62d and facilitate reduction in bulging from internal pressure, while still permitting the ribs 64 to move and thermally expand and contract at a different rate than the side walls 62c/62d during thermal cycling and without interference from adjacent ribs 64.

Each rib 64 includes first and second unbranched arms 68/70 that initiate at the second side wall 62d and extend there from to meet at a node, identified at N. A third unbranched arm 72 initiates at the first side wall 62c and extends perpendicularly (locally) there from. The third unbranched side arm 72 connects to the first and second unbranched arms 68/70 at the node (N) in this example. The perpendicular orientation provides the shortest distance to the node (N), thereby facilitating reductions in airfoil mass. The term "unbranched" refers to an arm that has no other arms extending off of it between its initiation point and the node to which it connects. It is to be further understood that the term "perpendicular" or variations thereof encompass deviations from 90° due to manufacturing tolerances or other variances, such as deviations of 90°+/−10%.

The first and second unbranched arms 68/70 together with the second side wall 62d define a triangular passage 74 (triangular in cross-sectional shape, taken in a plane perpendicular to the radial direction). The two ribs 64 in the airfoil 60 in this example also define the aft-intermediate passage 66c there between. In the illustrated example, the aft-intermediate passage 66c is a pentagonal passage (pentagonal in cross-sectional shape) that is bound by the third unbranched arms 72, the first unbranched arm 68 of one of the aft one of the ribs 64, the second unbranched arm 70 of the forward one of the ribs 64, and the first side wall 62c.

Cooling air, such as bleed air from the compressor section 24, is fed into and through the passages 66a/66b/66c/66d/74. For example, the triangular passages 74 are radial flow passages and the passages 66a/66b/66c/66d are a part of a serpentine cooling air circuit, generally denoted at 76. In this regard, the triangular passages 74 are fed from a radially inner location of the airfoil 60 (and/or radially outer location if the airfoil 60 is a vane) and the cooling air flows radially outwards. The cooling air is then discharged through the tip of the airfoil and/or through one or more cooling apertures 78. The triangular passages 74 serve to cool the second side wall 62d.

Cooling air for the passages 66a/66b/66c/66d is also fed from a radially inner location to either the passage 66a (for a forward-to-aft flow strategy) or passage 66d (for an aft-to-forward flow strategy). The cooling air then flow sequentially through the passages 66a/66b/66c/66d, turning in a platform or tip to flow from one passage to the next. The passages 66a/66b/66c/66d serve to cool the first side wall 62c. As will be appreciated, alternate cooling air feed schemes may alternatively be used, such as but not limited to, separately fed serpentine passage groups.

In the illustrated example, the passages 74 are flow isolated from the passages 66a/66b/66c/66d. As used herein, the phrase "flow isolated" or variations thereof refers to passages, channels, or both that are not fluidly connected to each other within the airfoil 60 such that air cannot flow within the airfoil 60 from one passage or channel to the other passage or channel. For instance, the cooling of the first side wall 62c is in essence segregated from the cooling of the second side wall 62d. This enables the cooling to be controlled and optimized for each side wall 62c/62d. As an example, different cooling air pressures are utilized in the triangular passages 74 versus the passages 66a/66b/66c/66d. Such pressures can be controlled, for example, by metering orifices or the like at or near the inlets of the cooling air into the passages 66a/66b/66c/66d/74.

Additionally, Coriolis effects cause relatively high heat transfer on the first side wall 62c and relatively low heat transfer on the second side wall 62d in radially outward cooling air flow schemes, facilitating reduction in thermal stresses between the relatively hot side walls 62c/62d and the relatively cool ribs 64. This is further facilitated by the geometry of the pentagonal passage 66c. For example, the passage 66c has a longest side defined by the first side wall 62c and a shortest side defined by one or both of the unbranched arms 68/70.

In additional examples, to facilitate additional cooling and performance enhancement, the triangular passages 74 have low aspect ratio geometries. For instance, referring to the triangular passage 74 in FIG. 2B, the second side wall 62d serves as the base of the triangle and defines a width (w). The arms 68/70 serve as the sides of the triangle and define a height (h). Such a width and height are defined by straight-line distances with respect to mid-line axes of the walls and intersections of such axes. In one example, the triangular passage 74 has an aspect ratio h/w of less than 0.75. A low aspect ratio enables fewer of the triangular passages 74 to cool the second side wall 62d, thereby reducing the number of ribs and in turn reducing airfoil mass. In a further example, the triangular passage 74 has an aspect ratio h/w of less than 0.5, which may facilitate further weight reduction as well as minimize reduction in heat transfer due to Coriolis effects.

In an additional example, the unbranched arms 68/70 are of substantially equal length. For example, the lengths are taken as straight line distances with respect to mid-line axes of the walls and intersections of such axes. The term "substantially equal" or variations thereof encompass deviations due to manufacturing tolerances or other variances, such as deviations of 10% between the lengths of the unbranched arms 68/70. The configuration in which the unbranched arms 68/70 are of substantially equal length facilitates balancing heat transfer and thermal stresses. Additionally, as the unbranched arms 68/70 are non-parallel with the second side wall 62d, the triangular passage 74 permits flexibility for the second side wall 62d to thermally expand/contract. For example, differences in thermal growth between the second side wall 62d and the rib 64 are taken up by the height of the triangle such that in a relatively cold state the triangle elongates in height and in a relatively hot state the triangle compresses in height.

The configuration of the rib or ribs 64 provides additional cooling configurations. For instance, as shown in the airfoil 160 in FIG. 3, the third unbranched arm 72 connects to the second unbranched arm 70 at the node (N1) in this example rather than a node that is at the apex of the triangle as in the example in FIG. 2A. As will be appreciated, the third unbranched arm 72 may alternatively connect to the first unbranched arm 68. In either case, the unbranched arm 72 is longer than in the example in FIG. 2A and thus adds mass in comparison. However, changing the location of the node facilitates changing the size of the passages 66b/66c/66d/74 to further tailor cooling effects.

Figure 4:
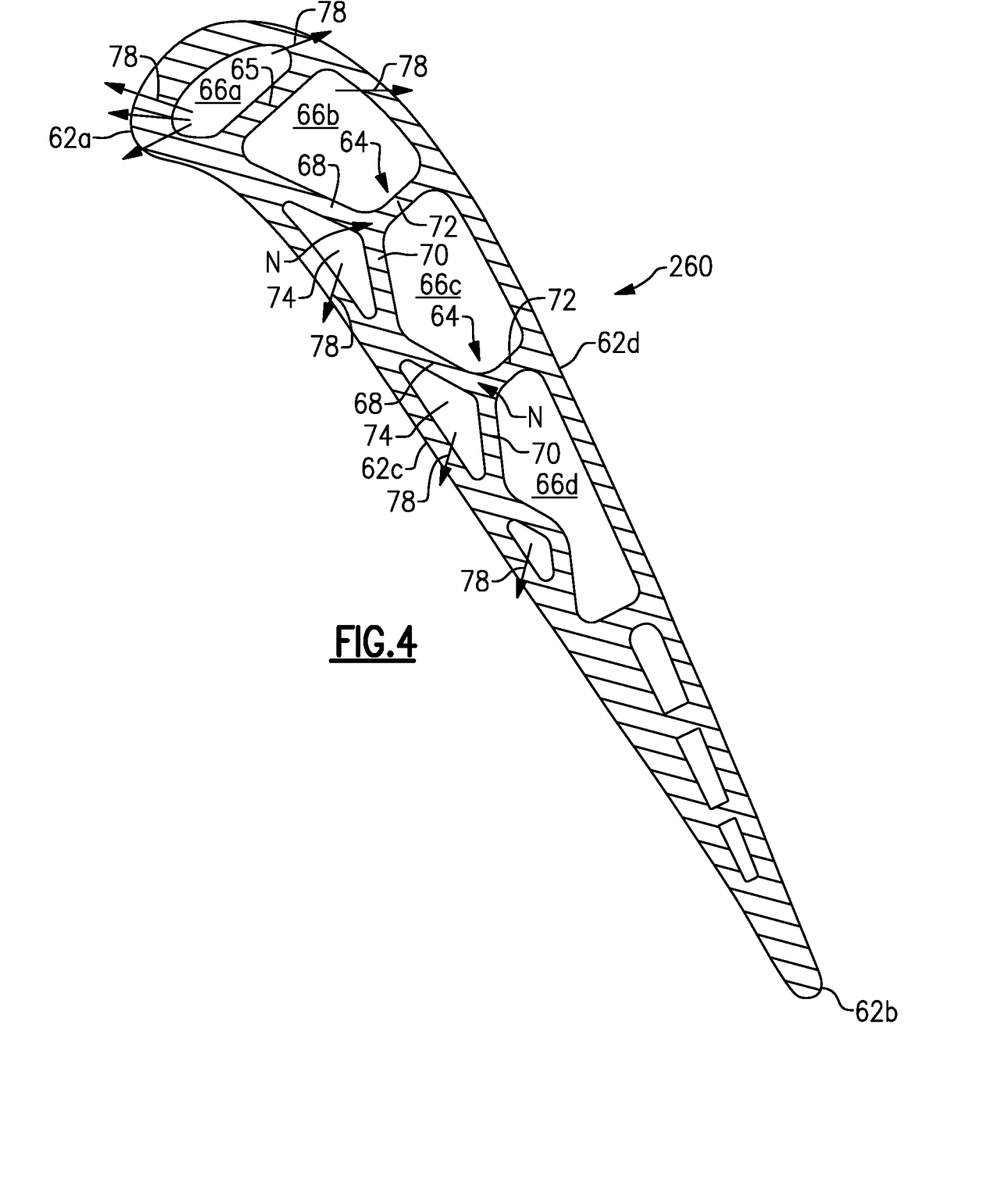
FIG. 4 illustrates another example airfoil for the gas turbine engine.

FIG. 4 illustrates a further example airfoil 260 that is the same as the airfoil 60 except that the orientation of the ribs 64 is flipped such that the triangular passages 74 border the first side wall 62c and the passages 66b/66c/66d border the second side wall 62d. For example, such a configuration facilitates reducing the amount of cooling air flow for high heat transfer on the pressure side. Additionally, the passages 66b/66c/66d may be part of a serpentine circuit as discussed above. The passages 66c/66d may exclude any film cooling apertures and the passage 66b may have film cooling apertures such that the cooling air is discharged forward of the gauge point of the airfoil 260. The gauge point is the axial location on the suction side of an airfoil where the gaspath Mach number is maximum and gaspath flow changes from accelerating to decelerating. Injecting the cooling air into the accelerating flow forward of the gauge point facilitates less loss than injecting into the decelerating flow.

Figure 3:
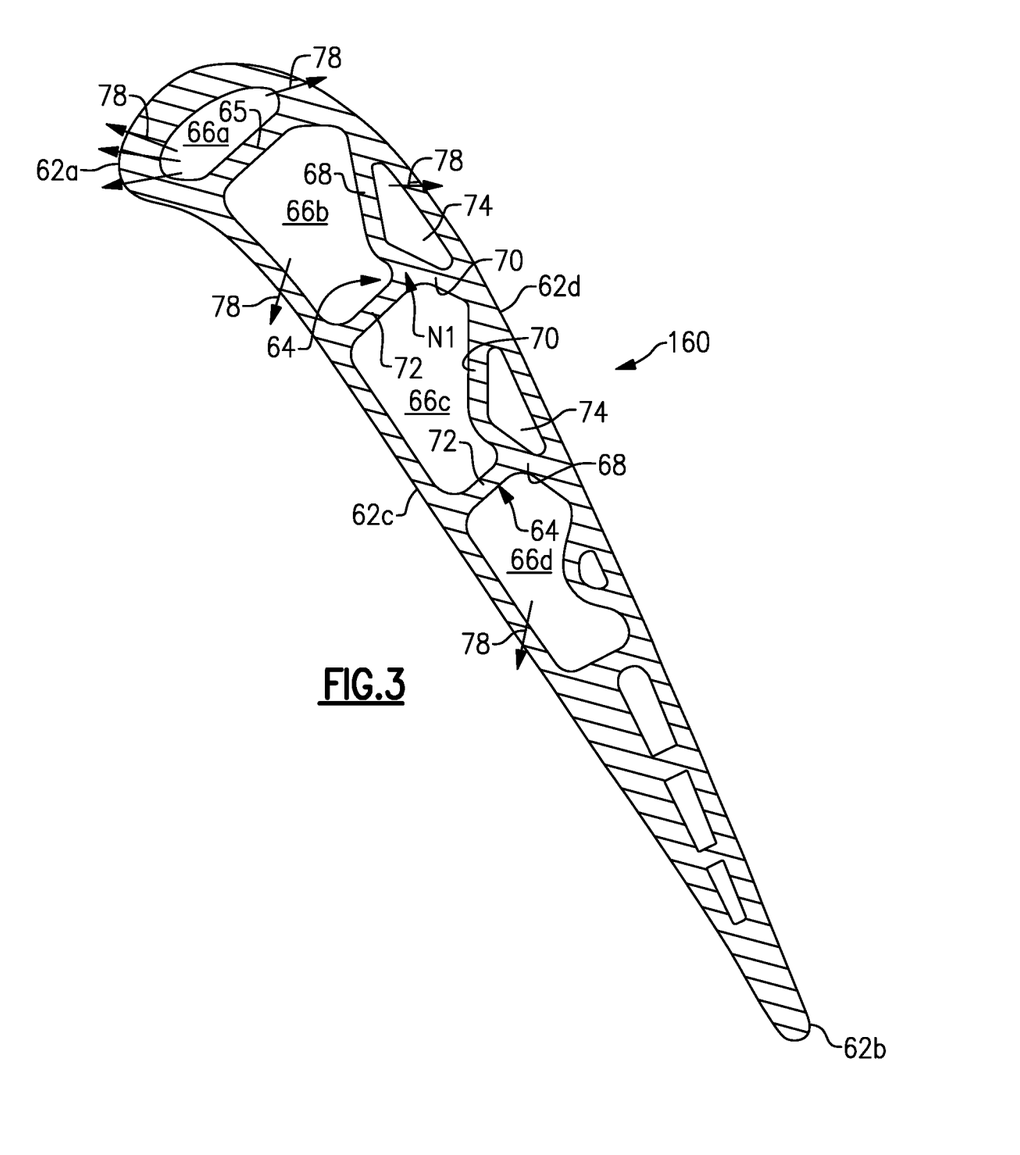
FIG. 3 illustrates another example airfoil for the gas turbine engine.

In additional examples, the airfoils 60/160/260 include cooling apertures 78. Flow arrows of the cooling air are shown and a depiction of a flow arrow that extends through a wall indicates that there is a cooling hole or aperture 78 at that location (not all of which are numbered).

The cooling apertures 78 provide additional cooling schemes to further enhance cooling. For instance, some of the cooling apertures 78 may serve as impingement holes to concentrate flow onto the inside surface of the adjacent portion of the wall 62. Other of the cooling apertures that are on the wall 62 serve as film cooling holes for the exterior surfaces of the airfoil wall 62. Other of the cooling apertures 78 that are on the long portions of the second and third arms 68/70 serve as feed holes to feed cooling air from the serpentine cooling air circuit 76 into the passage 74. Therefore, various configurations of the cooling apertures 78 can be used to control cooling air flow in the respective airfoils. In these examples, although cooling air may flow radially, the cooling apertures 78 provide for impingement cooling and axial flow of the cooling air.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil wall defining a leading end, a trailing end, a first side wall, and a second side wall; and
   a rib connecting the first and second side walls of the airfoil wall, the rib consisting of only three arms as follows:
      first and second unbranched arms initiating at the second side wall and extending there from to meet at a node, and
      a third unbranched arm initiating at the first side wall, the third unbranched arm extending perpendicularly there from and connecting at either the node, the first unbranched arm, or the unbranched second arm, the first unbranched arm, the second unbranched arm, and the third unbranched arm all being non-parallel with each other.

2. The airfoil as recited in claim 1, wherein the third unbranched arm connects at the node.

3. The airfoil as recited in claim 1, wherein the third unbranched arm connects at one of the first or second unbranched arms.

4. The airfoil as recited in claim 1, wherein the first and second unbranched arms together with the second side define a triangular passage.

5. The airfoil as recited in claim 4, wherein, with the second side wall as a base, the triangular passage defines a height (h) and a width (w) that have a ratio of h/w of less than 0.75.

6. The airfoil as recited in claim 5, wherein the ratio is less than 0.5.

7. The airfoil as recited in claim 4, wherein the third arm and the first side wall border a passage that is flow isolated from the triangular passage.

8. The airfoil as recited in claim 1, wherein the first and second arms are of substantially equal length.

9. The airfoil as recited in claim 1, wherein the node is a first node, the third unbranched arm connecting to the second unbranched arm at a second node that is between the first node and a connector node at which the second unbranched arm connects to the second side wall.

10. The airfoil as recited in claim 9, wherein the first and second unbranched arms together with the second side define a triangular passage, and the first node is at an apex of the triangular passage.

11. The airfoil as recited in claim 9, wherein the first unbranched arm, the second unbranched arm, and the third unbranched arm have respective mid-line axes, the first node is at an intersection of the mid-line axes of the first unbranched arm and the second unbranched arm, and the second node is at the intersection of the mid-line axes of the second unbranched arm and the third unbranched arm.

12. An airfoil comprising:
    an airfoil wall defining a leading end, a trailing end, a first side wall, and a second side wall; and
    a pair of ribs defining there between a pentagonal passage, each said rib connecting the first and second side walls of the airfoil wall and including
       first and second unbranched arms initiating at one of the first side wall or the second side wall and extending there from to meet at a node, the first and second unbranched arms together with the one of the first side wall or the second side wall defining a triangular passage there between, and
       a third unbranched arm initiating at the other of the first side wall or the second side wall, the third unbranched arm extending perpendicularly there from and connecting at the node.

13. The airfoil as recited in claim 12, wherein the pentagonal passage has a longest side defined by the first side wall.

14. The airfoil as recited in claim 13, wherein the second side wall is a suction side.

15. The airfoil as recited in claim 1, wherein the pentagonal passage is part of a serpentine cooling air circuit.

16. The airfoil as recited in claim 15, wherein the pentagonal passage excludes any cooling apertures through the first and second side walls.

17. A gas turbine engine comprising:
    a compressor section;
    a combustor in fluid communication with the compressor section; and
    a turbine section in fluid communication with the combustor,
    the turbine section having an airfoil that includes
       an airfoil wall defining a leading end, a trailing end, a first side wall, and a second side wall; and a rib connecting the first and second side walls of the airfoil wall, the rib consisting of only three arms as follows:
  first and second unbranched arms initiating at the second side and extending there from to meet at a node, and
  a third unbranched arm initiating at the first side wall, the third unbranched arm extending perpendicularly there from and connecting at either the node, the first unbranched arm, or the unbranched second arm, the first unbranched arm, the second unbranched arm, and the third unbranched arm all being non-parallel with each other.

18. The gas turbine engine as recited in claim 17, wherein the first and second unbranched arms together with the second side define a triangular passage.

19. The gas turbine engine as recited in claim 18, wherein, with the second side wall as a base, the triangular passage defines a height (h) and a width (w) that have a ratio of h/w of less than 0.5.

20. The gas turbine engine as recited in claim 19, wherein the third arm and the first side wall border a passage that is flow isolated from the triangular passage.

\* \* \* \* \*